Feb. 13, 1934.  S. RUBEN  1,947,112

ELECTRIC CONDENSER

Filed June 13, 1932

INVENTOR

Samuel Ruben

Patented Feb. 13, 1934

1,947,112

UNITED STATES PATENT OFFICE 1,947,112

ELECTRIC CONDENSER

Samuel Ruben, New Rochelle, N. Y., assignor to Ruben Condenser Company, New Rochelle, N. Y., a corporation of Delaware Application June 13, 1932. Serial No. 616,862

6 Claims. (Cl. 175—41)

This invention relates to electric condensers; specifically to condensers of the electrostatic type.

An object is to provide a condenser having a dielectric spacer of higher heat resistance than the paper commonly used in electrostatic condensers.

A further object is to provide a condenser having a dielectric spacer which contains a substantial amount of inorganic matter.

Figure 1:
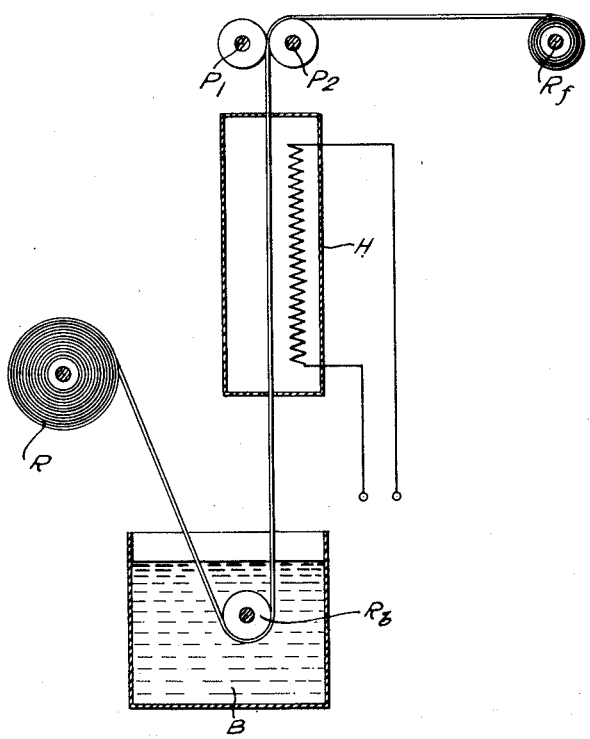
Figure 2:
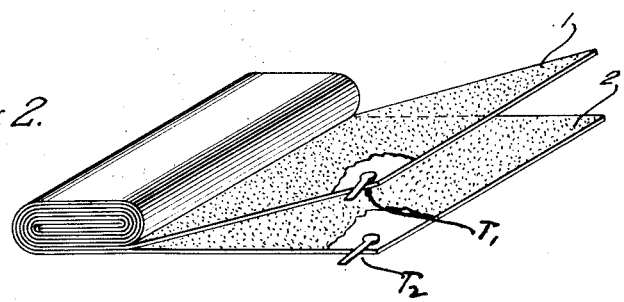

Other objects will be apparent from the disclosure and the drawing, Fig. 1 of which shows an apparatus for applying the dielectric to the condenser electrodes and Fig. 2 of which shows a finished condenser.

The condenser of this invention is an improvement over that described in my Patent No. 1,781,033 in which a finely divided oxide, such as titanium oxide, in combination with an organic dielectric vehicle, is used as a spacer element.

In the present condenser, the dielectric spacer consists of a varnish, lacquer or shellac type carrier, having suspended therein a finely divided nonconductive inorganic material, such as sulfur, aluminum (surface oxidized), oxides, silicates, etc. I also utilize a secondary binder, such as a borate, which tends to raise the heat resistance characteristics of the carrier and also gives a binding action at high temperatures.

The electrodes consist of metal plates, such as aluminum, copper, brass, etc. Preferably, I utilize aluminum that has been electrolytically oxidized, the function of the oxide being (1) to allow a more adherent dielectric to be applied to the electrode and (2) the dielectric strength of the oxide layer itself is of considerable advantage and utility.

In preparing the electrodes, the aluminum foil or strip is first cleaned to free it from surface impurities and it is then passed through a film forming electrolyte, such as ammonium borate and boric acid, a potential being meanwhile applied at a current of sufficient density. A continuous process is used and the progress of the foil is rapid. The formed electrodes are then thoroughly washed to free them from any salt, etc. and are heated to a temperature adequate to drive off all water vapor. They are then ready to be coated with the dielectric spacer. (Other film forming electrode materials such as tantalum, aluminum-magnesium alloys, etc., can of course be substituted for the aluminum.)

This spacer preferably consists of a dielectric mixture of the type described in my co-pending applications, S. N. 499,845 of 3 December 1930; S. N. 534,711 of 2 May 1931; S. N. 557,383 of 15 August 1931 or 580,531 of 12 December 1931, which cases generally describe an insulating material consisting of a resinous binder of the shellac-venice turpentine, oil-resin, glyptal or cellulose lacquer type, a finely divided inorganic insulating material, such as chromium sesqui-oxide, titanium oxide, etc., and a secondary binding material, effective at high temperatures, such as a borate. In the present invention, I may also use finely divided sulfur or aluminum (surface oxidized) in substitution in whole or in part for the finely divided solid matter of the above described applications.

I may prepare the resinous carrier as follows: 100 grams of flake shellac and 100 grams of venice turpentine are dissolved into 400 cc. of alcohol—

Or I may take 340 cc. of an insulating oil-resinous varnish, preferably of the type containing a synthetic resin of the phenol formaldehyde "Bakelite" type, and add to this 60 cc. of naptha thinner—

Or I may use 400 cc. of a properly diluted cellulose or glyptal lacquer.

Into any of these mixtures, I may put 100 grams of an inorganic high temperature binder of the borate type, preferably boric acid and 200 grams of an inorganic finely divided dielectric material. Among such materials suitable for use may be mentioned sulfur, aluminum (surface oxidized), the oxides of such materials as chromium, iron, titanium, aluminum, magnesium, beryllium, zirconium, etc.; also, compounds such as silicates, beryl, mica, etc.

The resinous carrier, the borate and the finely divided dielectric material, are ground for a long period of time in order to obtain a mixture which is free of large granules or lumps and in which the solids are of such small dimensions that they tend to stay in suspension.

The condenser is made by passing strips of the metal electrodes through a bath of one of the mixtures described, after which the strips are baked. Two coated electrodes, (or one coated and one uncoated) one of which is narrower than the other to prevent edge effects, are rolled, placed in a press and heated to the softening point. This forces the sheets into intimate contact with the dielectric and also cements the entire unit together, free of air spaces. If desired, the condenser may be further baked to a point where the inorganic binder, for instance, boric acid, melts and additionally cements the unit together.

The condenser requires no further impregnation such as is required with paper types. It will be found that the dielectric spacer is of high resistance and will withstand breakdown voltages from 700 to 1200 volts per mil thickness of mixture, thus preventing electrolytic effects.

An alternate method of manufacture is to electrolytically oxidize the metal electrodes, wash and dry them, roll them together and impregnate them with the insulating compound and then bake.

While the dielectric properties of the electrolytically formed aluminum oxide sheets are desirable, the condenser electrodes may consist of unoxidized aluminum or other suitable electrode materials, such as copper, brass, etc. which solder easily.

In order to describe the invention, reference is made to the accompanying drawing in which Fig. 1 illustrates the method of coating. The oxidized roll of aluminum foil R passes through a bath of coating material B, comprising a mixture of an oil resinous enamel, finely divided chromium sesqui-oxide and boric acid, being guided by roller $R_b$. The solvent in the mixture is evaporated and the coating baked by heater H. The foil is pressed and flattened out by rollers $P_1$ and $P_2$ and is wound into roll $R_f$.

In Fig. 2 is shown the condenser having coated electrode sheets 1 and 2 to which contacts are made by tabs $T_1$ and $T_2$.

I claim:

1. A condenser having a dielectric spacer consisting of a homogeneous mixture of a finely divided inorganic dielectric material, a water insoluble resinous binder and an inorganic binder comprising a boron compound.

2. A condenser having a dielectric spacer consisting of a homogeneous mixture of an oil-resinous varnish, a boron compound and a finely divided inorganic dielectric material.

3. A condenser comprising oxidized electrodes in intimate contact with a dielectric spacer consisting of a homogeneous mixture of a finely divided inorganic dielectric material, a water insoluble resinous binder and an inorganic binder comprising a boron compound effectve at high temperatures.

4. A condenser comprising oxidized aluminum electrodes in intimate contact with a dielectric spacer consisting of a homogeneous mixture of a finely divided inorganic dielectric material, a water insoluble resinous binder and an inorganic binder comprising a boron compound effective at high temperatures.

5. A condenser comprising aluminum electrodes in intimate contact with a dielectric spacer consisting of a homogeneous mixture of finely divided oxide, an oil-resinous varnish and an inorganic binder comprising a boron compound effective at high temperatures.

6. A condenser comprising oxidized aluminum electrodes in intimate contact with a dielectric spacer comprising a homogeneous mixture of finely divided chromium-sesqui oxide and boric acid held in intimate contact with said electrodes by a baked oil-resinous enamel in which said oxide and boric acid are suspended.

SAMUEL RUBEN.